COORDINATE TRANSFORMATION COMPUTER

Filed Sept. 23, 1959 7 Sheets-Sheet 1

Gilbert R. Grado,
INVENTOR.
BY S. J. Rotondi
A. G. Dupont
C. A. Phillips

COORDINATE TRANSFORMATION COMPUTER

Filed Sept. 23, 1959 7 Sheets-Sheet 2

Gilbert R. Grado,
INVENTOR.
BY S. J. Rotondi
A. J. Dupont
C. A. Phillips

Gilbert R. Grado,
INVENTOR.
BY S. J. Rotondi
A. J. Dupont
C. A. Phillips

COORDINATE TRANSFORMATION COMPUTER

Filed Sept. 23, 1959

Gilbert R. Grado,
*INVENTOR.*
*BY* S. J. Rotondi
A. J. Dupont
C. A. Phillips

COORDINATE TRANSFORMATION COMPUTER

Gilbert R. Grado,
*INVENTOR.*

BY S. J. Rotondi
A. J. Dupont
C. A. Phillips

Feb. 19, 1963

G. R. GRADO 3,078,042

COORDINATE TRANSFORMATION COMPUTER

Filed Sept. 23, 1959

7 Sheets-Sheet 6

Gilbert R. Grado,
INVENTOR.

BY S. J. Rotondi
A. J. Dupont
C. A. Phillips

Gilbert R. Grado,
*INVENTOR.*
*BY* S. J. Rotondi
A. J. Dupont
C. A. Phillips

United States Patent Office
3,078,042
Patented Feb. 19, 1963

3,078,042

COORDINATE TRANSFORMATION COMPUTER

Gilbert R. Grado, El Paso, Tex., assignor to the United States of America as represented by the Secretary of the Army Filed Sept. 23, 1959, Ser. No. 841,910
7 Claims. (Cl. 235—187)
(Granted under Title 35, U.S. Code (1952), sec. 266)

This invention described herein may be manufactured and used by or for the Government for governmental purposes without the payment of any royalty thereon.

This invention relates to electronic computers and particularly to a computer for solving problems involving the transformation from one set or frame of spatial coordinate references to another.

It is an object of this invention to provide a computer which requires fewer components and less time to program.

The novel features that are considered characteristic of this invention are set forth with particularity in the appended claims. The invention itself, however, both as to its organization and method of operation as well as additional objects and advantages thereof will best be understood from the following description when read in connection with the accompanying drawing in which:

Figure 1:
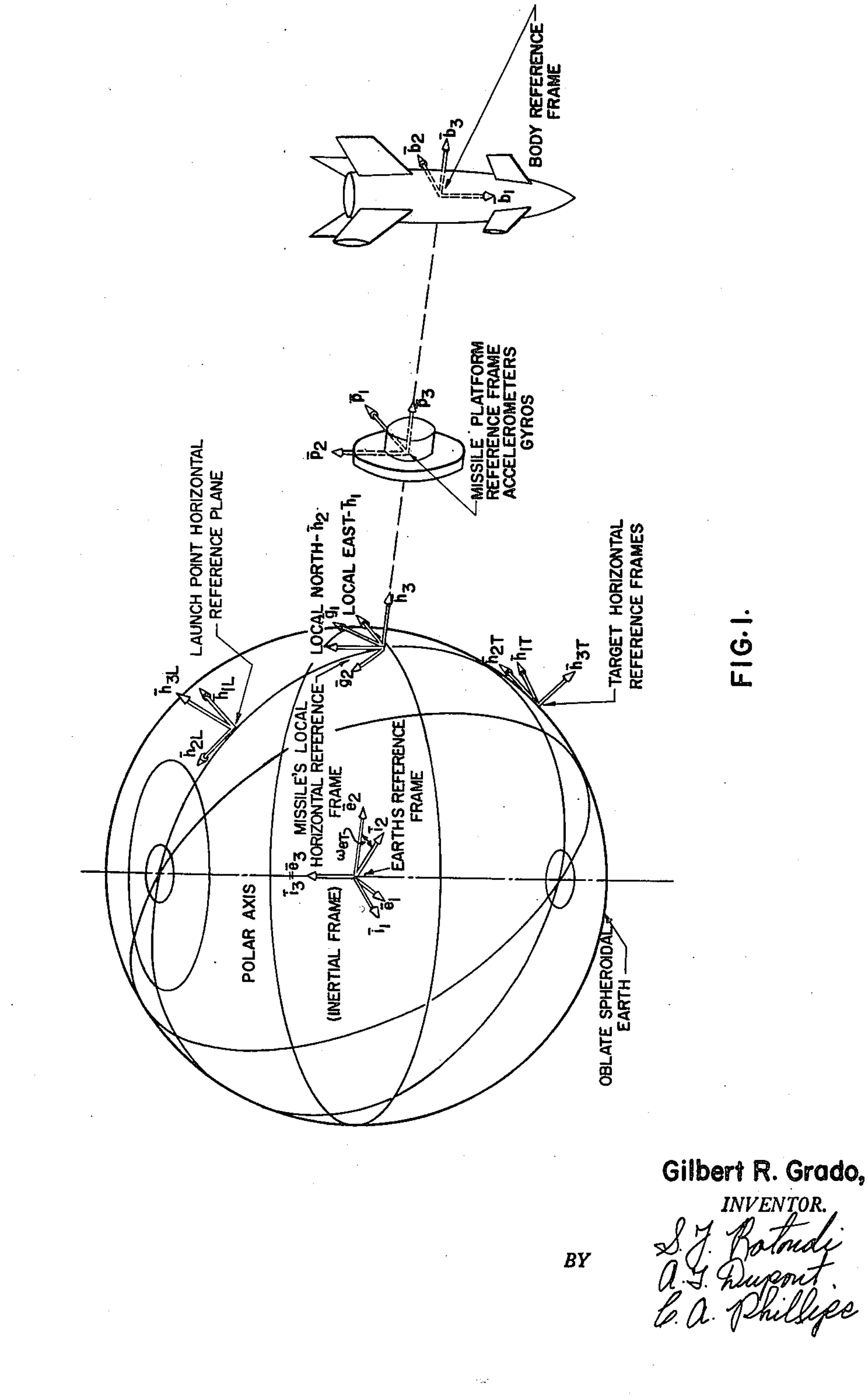
FIGURES 1–4 illustrate the nature of the problems to be solved by the invention.

As is well known the location and motion of an object in space, either real or hypothetical, may be conveniently plotted with a respect to three perpendicular axes rigidly fixed with respect to each other. A set of these axes, which we will refer to as a frame, may as a whole be oriented to best serve the problem at hand. Examples of these reference frames, particularly as applied to space vehicles and guided missile weapons, are shown in FIGURE 1.

The angular relationship between various three dimensional reference frames associated with missile weapon systems is one of the basic required studies necessary in system synthesis and system analysis. For, in the design of a weapon system wherein a guided missile is to be automatically vectored to a target, innumerable vector resolutions are required. For example, a Doppler-inertial guidance system requires transformations of Doppler velocity along carrier axes to components of Doppler velocity along platform axes. Angular relations are necessary for the alignment of slaved platforms to a master platform for air-launched ballistic missiles, and for the stabilization of radar, cameras, star-tracker, or gimballed engine mounts. Knowledge of the missile attitude (heading, elevation angle, or other angles depending upon the type of flightpath control used) can be obtained from gyros and stable platforms. In system simulation studies, various types of coordinate transformations are necessary, some of which in actual flight are achieved physically.

One reference frame may be uniquely oriented with respect to a second reference frame through three ordered angles. These are termed Euler angles and are of two types:

(1) Repetitive Euler angles as used in classical mechanics in which one of the three angular rotations is repeated and a line of nodes is established, e.g. the three ordered rotations might be yaw, roll, yaw.

(2) Successive Euler Angles in which none of the rotations are repeated, e.g. yaw, pitch and roll. The first rotation is about an axis of the one (initial) reference frame, the third of the ordered rotations is about an axis of the other (final) reference frame, and the second rotation is about an axis normal to the first and third rotation axes.

The roll axis as contemplated herein is the $\overline{F}_1$ or $\overline{R}_1$; (roll axis after *j*th rotation vector). For example if the first rotation is a roll, then the roll axis is $\overline{F}_1$, if the first rotation is either pitch or yaw and the second rotation roll, then $\overline{R}_{11}$ is the roll axis, that is, the roll axis after the first rotation. If the last rotation is roll then the roll is $\overline{R}_{12}=\overline{R}_1$ (final position of roll axis). Similar considerations hold for the pitch axis and yaw axis.

Thus it is seen that the angles $r$ (roll), $p$ (pitch), $y$ (yaw) respectively are measured in "variable planes" perpendicular to their axes of rotation, where the axis of rotation is a function of the Euler sequence used.

Gimballed body (e.g. gyros, stable platforms, and radar antennas) pick off angles are of the successive type and consequently extensively used in missile equations of motion. Therefore, the Euler angles referred to herein are to be understood to be successive type Euler angles.

Figures 2, 3:
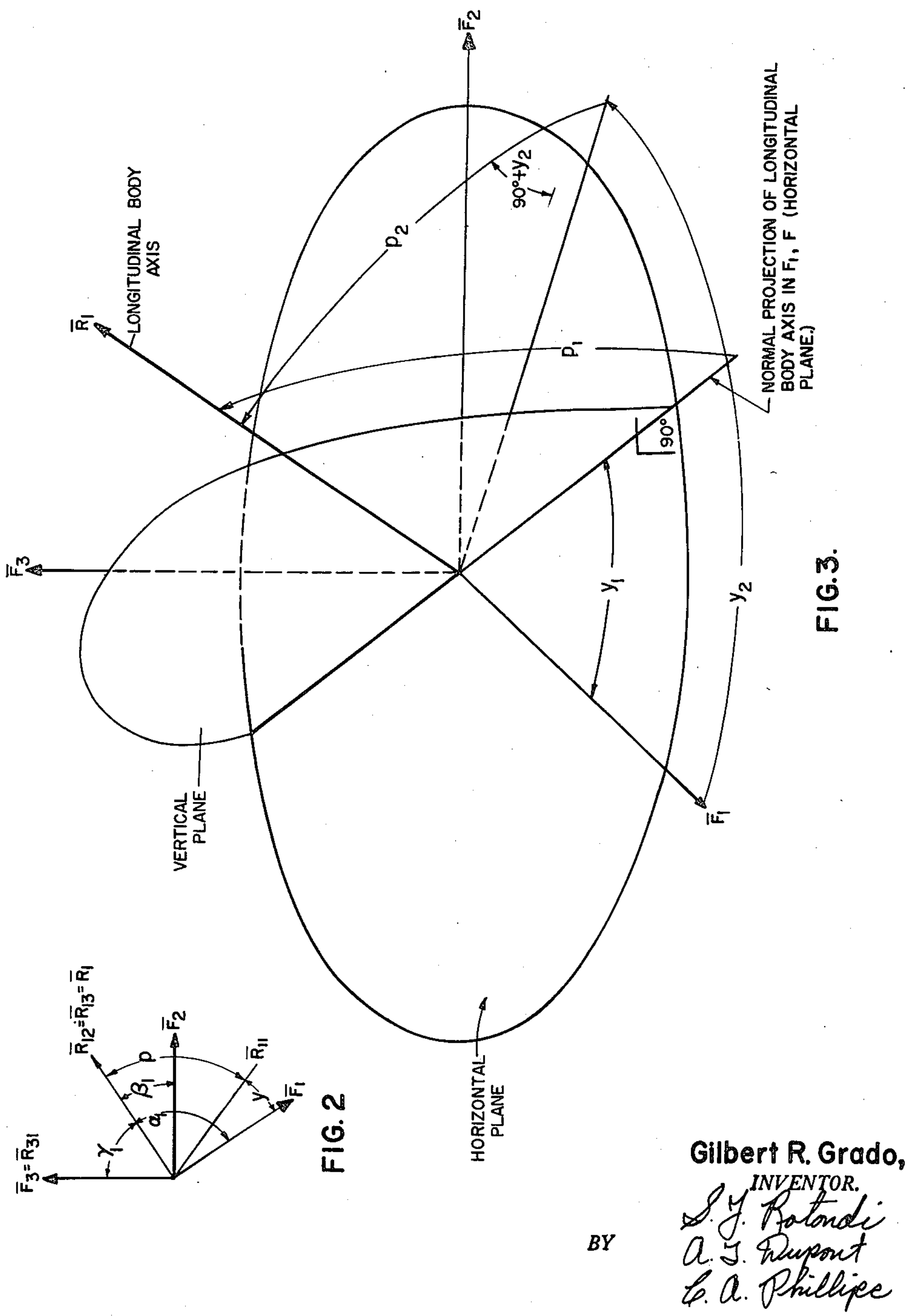

Consider the orientation of a unit vector $\overline{R}_1$ in the $\overline{F}_1$ reference frame (FIGURE 2). As shown, the three angles that $\overline{R}_1$ makes with the $\overline{F}_1$, $\overline{F}_2$ and $\overline{F}_3$ axes respectively are given by $\alpha_1$, $\beta_1$ and $\gamma_1$. The direction cosine between the $\overline{R}_1$ and $\overline{F}_1$ unit vector is $\cos \alpha_1=\overline{R}_1.\overline{F}_1$ In terms of Euler angles (for example radar coordinates-azimuth angle $y$ and elevation angle $p$) the relationship between $\alpha_1$, $y$ and $p$ is $\cos \alpha_1=\cos y \cos p$.

The total number of ordered sets or sequences of Euler angles is given by the permutations of three angles taken three at a time, or six. The angles used are $r, p, y$, where the correspondence is such that $r, p, y$ are always associated with rotations about the $\overline{R}_{1j}$, $\overline{R}_{2j}$, $\overline{R}_{3j}$ ($j=1, 2, 3$) vectors, respectively. The sequences of rotations are:

$y\ p\ r$
$y\ r\ p$
$r\ y\ p$
$r\ p\ y$
$p\ r\ y$
$p\ y\ r$

The Euler Angles represent an ordered triple of numbers, thus for a unique orientation of one frame ($\overline{R}_1$ with respect to a second frame $\overline{F}_1$) the angles $y$, $p$ and $r$ for the sequence ($y_1$, $p_1$, $r_1$) will have different numerical values than the angles $y_2$, $r_2$ and $p_2$ for the sequence ($y_2$, $r_2$, $p_2$). This is shown in FIGURE 3 where the yaw angle and elevation angles for the first sequence represent respectively the normal projection of the $\overline{R}_1$ axis in the $\overline{F}_1$, $\overline{F}_2$ plane (heading angle for zero angle of attack) and the pitch angle is the elevation plane pitch angle. For the second sequence ($y_2$, $r_2$, $p_2$), $y_2$ is not the heading angle and $p_2$ is a plane of symmetry pitch angle if a symmetrical air frame were assumed with $\overline{R}_1$ longitudinal axis, and $\overline{R}_2$ a left wing axis. Thus, unless an Euler sequence is specified, the three commonly denoted angles yaw, pitch, and roll are without specific meaning.

By determining the direction cosine matrix for each of the angular rotations in turn for a particular sequence, and multiplying these matrices together, the direction cosine matrix for the overall transformation of vectors from one frame to another can be obtained. For example, the matrices for the sequences $y$, $p$, $r$ and $y$, $r$, $p$ are as follows:

*Sequence y, p, r*

$$\overline{R}_1=\overline{F}_1(\cos p \cos y)+\overline{F}_2(\cos p \sin y)+\overline{F}_3(-\sin p)$$

$$\overline{R}_2=\overline{F}_1(\sin r \sin p \cos y-\cos r \sin y)+\overline{F}_2(\sin r \sin p \sin y+\cos r \cos y)+\overline{F}_3(\sin r \cos p)$$

$$\overline{R}_3=\overline{F}_1(\cos r \sin p \cos y+\sin r \sin y)+\overline{F}_2(\cos r \sin p \sin y+\sin r \cos y)+\overline{F}_3(\cos r \cos p)$$

By interchanging the rows and columns of the matrix and changing the signs of the angles we may solve for $\overline{F}_1$, $\overline{F}_2$ and $\overline{F}_3$ and thus perform the inverse vector transformation.

Rewritten in this form we have:

$$\overline{F}_1=-\overline{R}_1(\cos p \cos y)-\overline{R}_2(\sin r \sin p \cos y+\cos r \sin y)-\overline{R}_3(\cos r \sin p \cos y+\sin r \sin y)$$
$$\overline{F}_2=-R_1(\cos p \sin y)-\overline{R}_2(\sin r \sin p \sin y+\cos r \cos y)-\overline{R}_3(\cos r \sin p \sin y+\sin r \cos y)$$
$$\overline{F}_3=-\overline{R}_1(-\sin p)-\overline{R}_2(\sin r \cos p)-\overline{R}_3(\cos r \cos p)$$

*Sequence r, y, p*

$$\overline{F}_1=-\overline{R}_1(\cos p \cos y)-\overline{R}_2(+\sin y)-\overline{R}_3(\sin p \cos y)$$
$$\overline{F}_2=-\overline{R}_1(\cos p \sin y \cos p)-\overline{R}_2(\cos r \cos y)-\overline{R}_3(\sin p \sin y \cos r+\cos p \sin r)$$
$$\overline{F}_3=-\overline{R}_1(\sin y \sin r \cos p+\sin p \cos r)-\overline{R}_2(\cos y \sin r)-\overline{R}_3(\sin p \sin r \sin y+\cos p \cos r)$$

As will be appreciated from the foregoing there are a total of 54 matrix elements (27 repeated with opposite sign) involved in the 6 sequences of rotation.

In the simulation of the guided missile system it also becomes necessary to generate the Euler angles. The information available consists of the initial angle plus the relative angular velocities of the rotating frame with respect to the fixed reference frame. The missile studies up to the present have used the fixed reference frame as an inertial frame, and the equations relating the motions between the two frames are shown as follows for the following two of the six sequences.

*Sequence y, p, r*

$$\dot{y}=(Q_r \sin p+R_r \cos r) \sec p$$
$$\dot{p}=Q_r \cos r-R_r \sin r$$
$$\dot{r}=P_r+(Q_r \sin r+R_r \cos r) \tan p$$

*Sequence y, r, p*

$$\dot{y}=(R_r \cos p-P_r \sin p) \sec r$$
$$\dot{r}=P_r \cos p+R_r \sin p$$
$$\dot{p}=Q_r+(R_r \sin p-R_r \cos p) \tan r$$

Where $\dot{y}$, $\dot{p}$, $\dot{r}$ represent the angular velocity of $y$, $p$, $r$ and $P_r$, $Q_r$ and $R_r$ are the three angular velocities about $\overline{R}_1$, $\overline{R}_2$ and $\overline{R}_3$, respectively.

Upon examination of the direction cosine matrices for the various sequences, a definite pattern has been discovered. Even though the angles are referred to by different names and the axes numbered in a different manner, there is always a rotation about an axes of the first reference frame, a second rotation about an axis normal to the first and third rotation axes, and a third rotation about an axis of the final reference frame.

With reference to an analysis of the ramifications of this finding a unique computing system has been devised. It fulfills the object of providing a means of vector transformation comprising fewer components and requiring much less programming time.

In accordance with the invention means are provided to generate three Euler angles and sine and cosines thereof, the first angle $\measuredangle a$ from the first rotation which is about an axis of a first reference frame, the second angle $\measuredangle b$ from the second rotation about an axis normal to the first and third axes, and the third angle $\measuredangle c$ from the third rotation which is about an axis of a final reference frame. Next, the sine and cosine components are uniquely combined to obtain as a function of $\measuredangle a$, $\measuredangle b$ and $\measuredangle c$, a matrix, the elements of which when multiplied by corresponding vectors along axes of a first frame produces vectors along axes of a second frame of axes. Finally means are provided to perform this multiplication and to appropriately combine all vector components from the first frame to form the three resulting or transformed vectors in the second frame.

Figure 5:
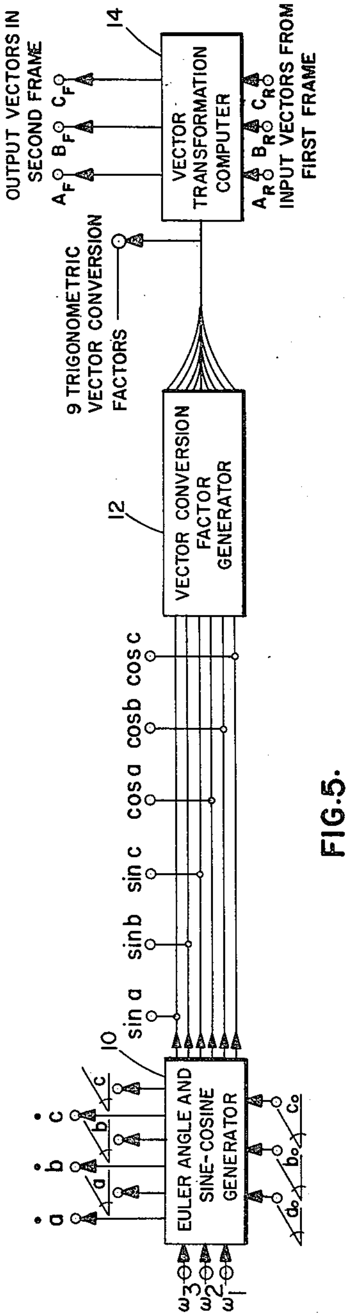
FIGURE 5 shows a block diagram of an embodiment of the invention.
Figure 4:
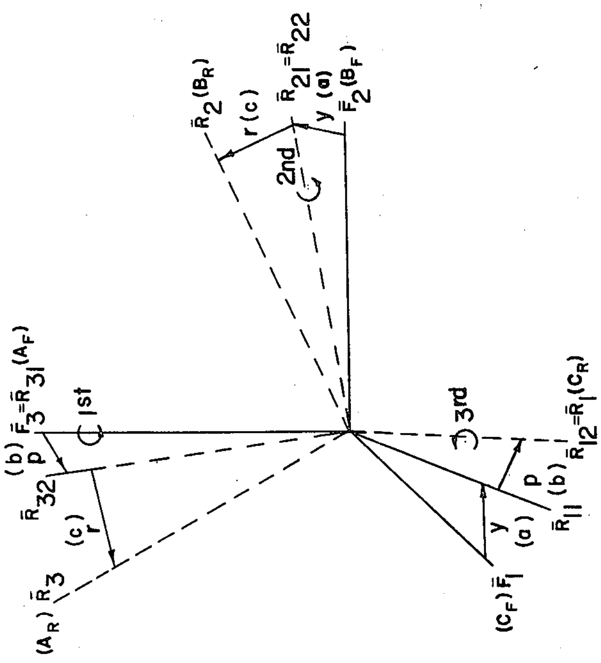
Figure 6:
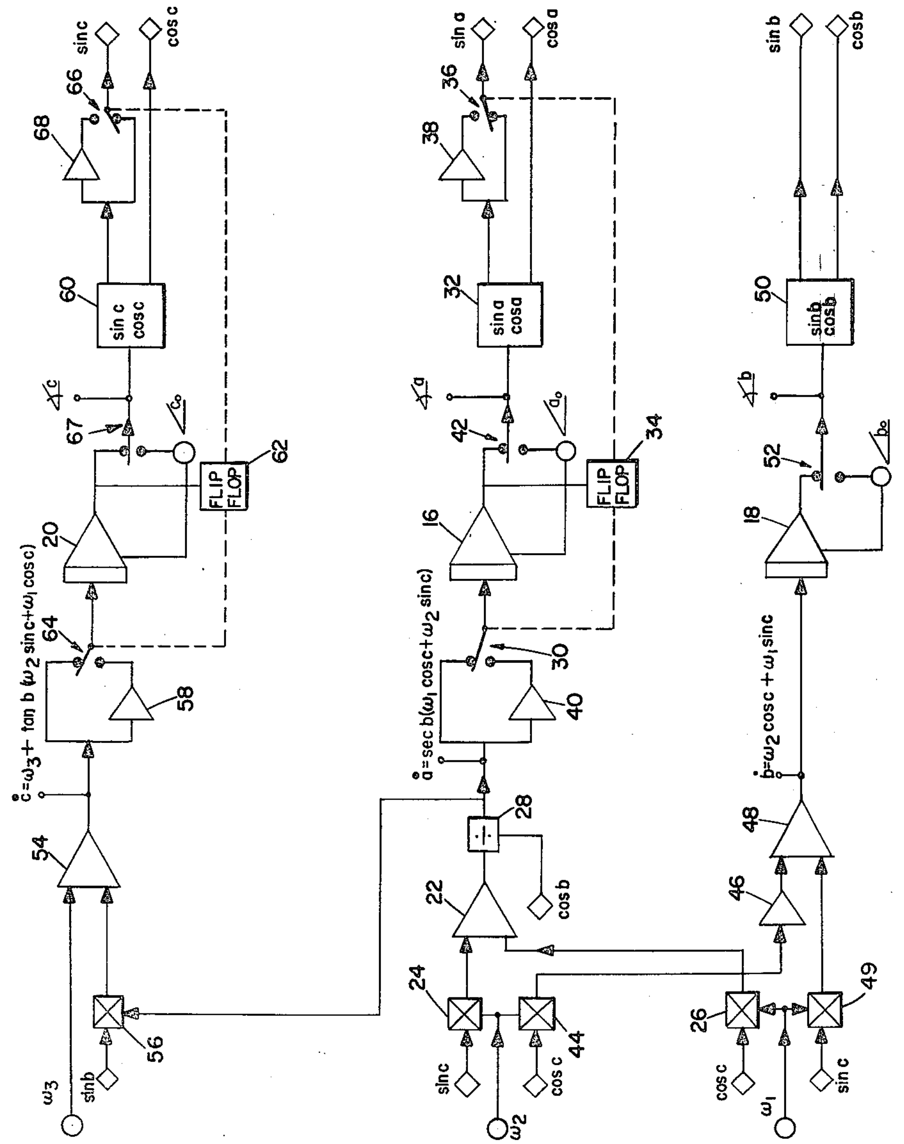
FIGURES 6–9 show in detail elements of an embodiment of the invention.

Referring now to FIGURE 5 illustrating the complete computer there is shown Euler angle and sine-cosine generator 10 to which is applied initial Euler angles $\measuredangle a_0$, $\measuredangle b_0$ and $\measuredangle c_0$ and rates of rotation $\omega_1$, $\omega_2$ and $\omega_3$ which represent the angular rotation about the first axis of rotation, the second axis of rotation and the third axis of rotation, respectively, of the rotating frame (FIGURE 4). As illustrated in FIGURE 6, generator 10 solves these equations for Euler angle rates $\dot{a}$, $\dot{b}$ and $\dot{c}$:

$$\dot{a}=\sec b(\omega_1 \cos c+\omega_2 \sin c)$$
$$\dot{b}=\omega_2 \cos c+\omega_1 \sin c$$
$$\dot{c}=\omega_3+\tan b(\omega_2 \sin c+\omega_1 \cos c)$$

In order to program the computer in terms of the actual Euler angles yaw, pitch and roll it is only necessary to consider them $\measuredangle a$, $\measuredangle b$ and $\measuredangle c$ in accordance with the sequence in which they occur. As illustrated in FIGURE 4 for the sequence yaw ($y$), pitch ($p$) and roll ($r$). The yaw angle is designated $\measuredangle a$, the pitch angle $\measuredangle b$ and roll angle $\measuredangle c$.

Next the Euler angles rates are integrated with respect to time in integrators 16, 18 and 20 and combined with the initial Euler angles to provide the instantaneous Euler angle outputs $\measuredangle a$, $\measuredangle b$ and $\measuredangle c$.

Finally generator 10 responsive to voltages proportional to $\measuredangle a$, $\measuredangle b$ and $\measuredangle c$ generates function signals which are the sines and cosines of these angles. These functions are applied as an input to vector conversion factor generator 12, shown in detail in FIGURE 8. A matrix of nine vector conversion factors are generated and these factors are sufficient to transform vectors from one frame to another regardless of the sequence of rotation.

Figure 9:
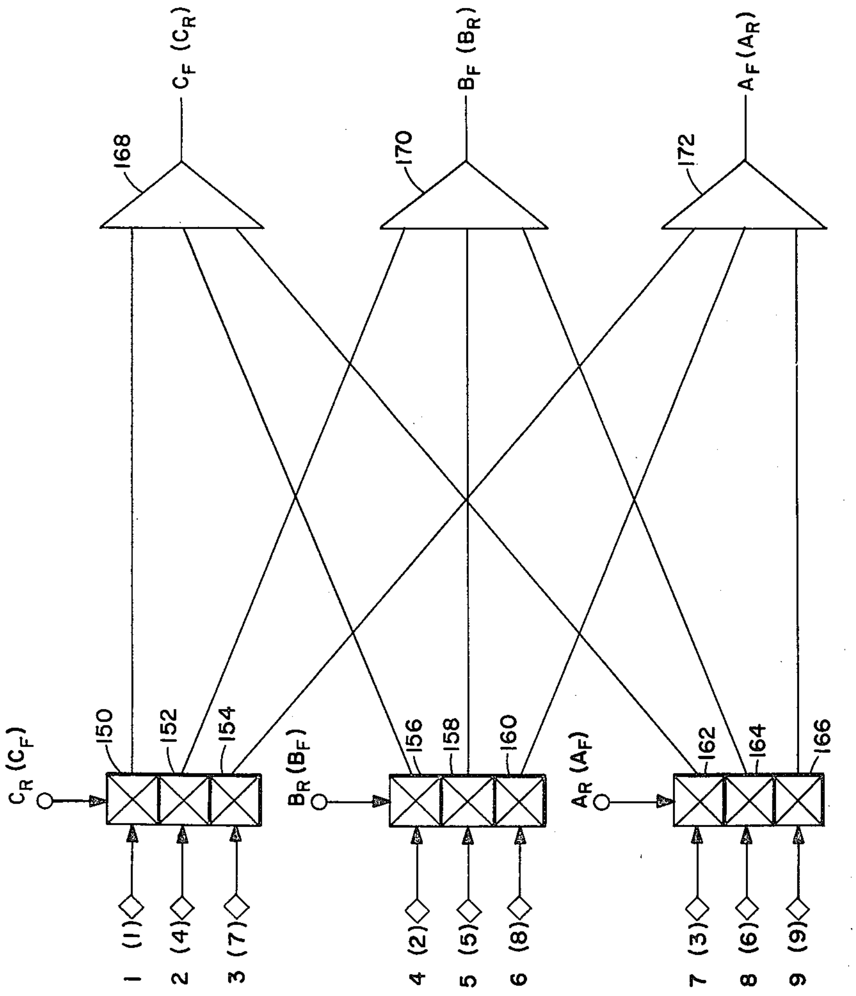

The output of generator 12 is applied to vector transformation computer 14, which is shown in detail in FIGURE 9. This computer is designed to multiply each vector in a first frame by the three conversion factors which produce the components of this vector along each of the three axes of the second frame. Second, the computer adds all like component vectors so produced to obtain the three final vectors in the second frame. FIGURE 2 and the discussion thereof illustrates the derivation of the sine-cosine factor necessary to transform one vector of a first frame to a component of a final frame.

Considering now the Euler angle and sine-cosine generator shown in FIGURE 6, it is to be noted that the identically labeled diamond shape terminals are interconnected. The round terminals indicate a generator input. The value $\dot{a}$ is solved by adding (or subtracting depending upon the sign of the quantity) in amplifier 22 the product $\omega_2 \sin c$ obtained in multiplier 24 and the product $\omega_1 \cos c$ obtained in multiplier 26. The sum is then divided in divider 28 by cos $b$ (in effect multiplied by sec $b$). The value $\dot{a}$ is then applied through the upper (or lower) terminal of switch 30 to integrator 16 which produces $\measuredangle a$. Angle $a$ from integrator 16 is supplied to sine-cosine generator 32 which produces sines and cosines of $\measuredangle a$. Flip-flop 34 is also responsive to $\measuredangle a$, the output of integrator 16, is triggered when $\measuredangle a$ approaches $\pi$ or $-\pi$ and causes switches 30 and 36 to operate causing a reversal in phase of the voltages these switches supply due to the presence of unity gain phase reversing amplifiers 38 and 40. Switch 42 is provided for the instance in which the Euler angles are generated externally and $\measuredangle a$ is known. In this case the moving contact is moved to the lower position and $\measuredangle a_0$ is directly supplied to sine-cosine generator 32. Otherwise $\measuredangle a_0$ is added to the generated component of $\measuredangle a$ in integrator 16.

The value $\dot{b}$ is solved by adding the product $\omega_2 \cos c$ obtained by multiplier 44 through amplifier 46 in amplifier 48 to the product $\omega_1 \sin c$ obtained by amplifier 49. The value $\dot{b}$ is fed to integrator 18 to obtain $\measuredangle b$ which in turn is supplied sine-cosine generator 50 which generates the sines and cosines of $\measuredangle b$. Switch 52 provides for an initial Euler angle $\measuredangle b_0$ to be added to the angle generated or supplied directly to sine-cosine generator 50. The operation of the sine-cosine generator for $\measuredangle b_1$ the second angle in the Euler sequence, is limited to less than ±90 degrees and thus there is no provision for reversing the phase of angle ∢$b$ or the sine of angle ∢$b$. This is compatable with most operations since 90° physically symbolizes gimbal lock in a gyro.

The value $\dot{c}$ is obtained by adding $\omega_3$ in amplifier 54 to the product of the output of divider 28 and sin $b$ obtained from multiplier 56. The value $\dot{c}$ is fed to integrator 20 directly or through unity gain phase reversing amplifier 58. The output of integrator 20, ∢$c$+ ∢$c_0$ or ∢$c_0$ alone by virtue of switch 67 is fed to sine-cosine generator 60 which produces sines and cosines of ∢$c$. Flip-flop 62 serves to activate switches 64 and 66 to reverse the sign to ∢$c$ and sine $c$ by virtue of unity gain phase reversing amplifiers 58 and 68 when the voltage representative of ∢$c$ approaches $\pm\pi$. The incorporation of this feature with respect to the first (∢$a$), and third (∢$c$) angles allows continuous rotation of these angles to be observed. Switches 42, 52, and 67 are actuated simultaneously.

Figure 7:
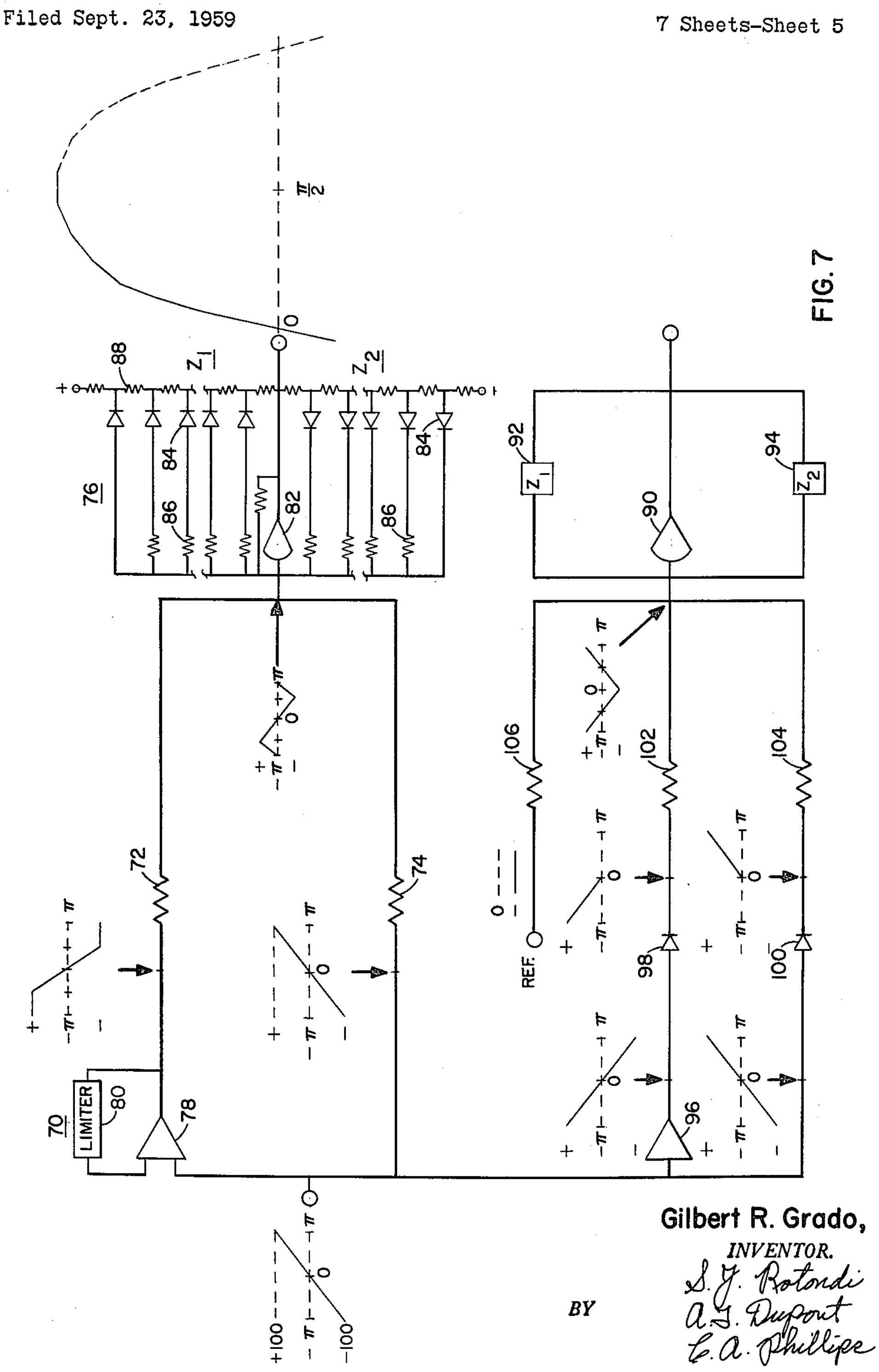

To examine in detail the sine-cosine generator employed as sine-cosine generators 32, 50 and 62 reference is made to FIGURE 7. The generator is supplied an input as illustrated in which zero degrees is represented by zero voltage, $\pi$ is represented by a maximum positive voltage and $-\pi$ by a maximum negative voltage. This input is fed through phase reversing limited amplifier stage 70 comprising amplifier 78 having a gain of 2 and limiter 80. The output is combined through load resistor 72 with the original input through load resistor 74. Due to the limiting effect at $\pi/2$ and $-\pi/2$ the results is a sawtooth wave voltage. This voltage is fed to shaping amplifier stage 76. This stage is provided with amplifier 82 and a series of diode (84)—resistor (86) negative feedback paths topped off between equal value resistors 88 forming a load circuit. The result is that as the output voltage increases in magnitude either positive or negative the amplifier gain decreases in steps or breakpoints to provide an output which approximates a sine wave. The breakpoints are set at equal intervals and when set at six degree intervals an accuracy of .01% is provided up to 30° and within .02% up to 90°. Thus the maximum accuracy is provided where the sine values are smallest. This is important where a number of multiplications are to be performed. Assume for example that instead of a relatively constant percent error as is the case here, tolerances are, as is common in terms of a percent of full scale, which of course represents a decreasing percent of error, maximum at low values and minimum at large values. Assume further that an error of .01 of full scale is provided and that the range of response is between 0 and 100. At 100 the error of 1 may be insignificant but at an indicated value of 2, the error could be 50%. If the indicated value were to be multiplied by, say a value of 80, the product could be from 80 to 160, an intolerable range of error. By providing a generator in which as the quantity decreases the error decreases, this situation is avoided; and as in the case here, extreme accuracy over several multiplications may be obtained. The error of the generator just described is approximately equal to the sine of the angle.

The cosine generator employed an identical amplifier 90 and identical positive and negative voltage feedback networks $Z_1$ and $Z_2$ to those shown for the sine generator. Their operation is the same, except of course the voltage must be shifted 90°, which is accomplished by an absolute value input circuit and an oppositely poled reference voltage. The absolute value of the angular input voltage is provided by applying the input voltage to two paths, one of which reverses the phase (in unity gain amplifier 96) of the current flow. The paths contain diodes 98 and 100 which allow current to pass in the same direction in both paths. The outputs of the diodes are connected through resistors 102 and 104 to the input of amplifier 90 at which point it is combined with an oppositely poled reference voltage applied through resistor 106. The resultant sawtooth voltage is shown.

Figure 8:
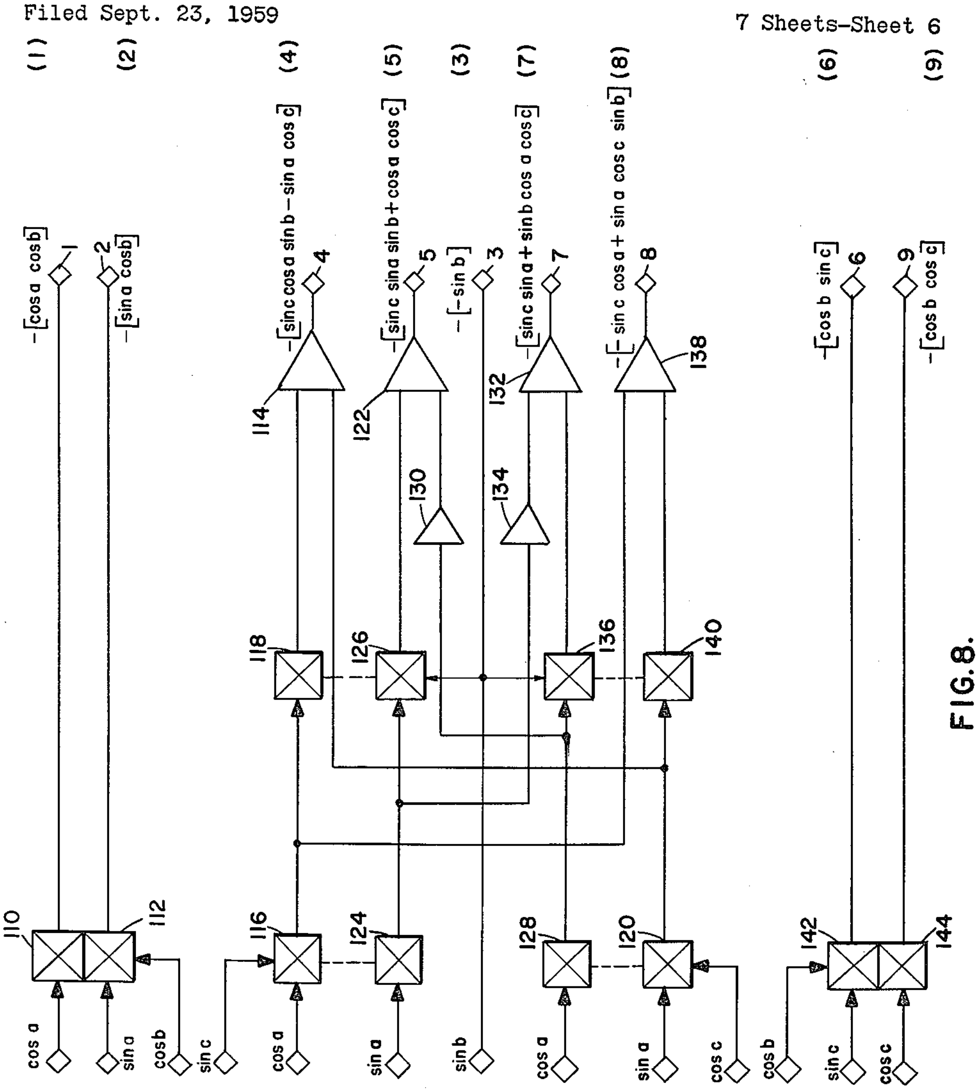

The Vector Conversion Factor Generator shown in FIGURE 8 and Vector Transformation Computer shown in FIGURE 9 comprise computing elements arranged to satisfy the following equations between vectors of a first reference frame and vectors of a second reference frame and thus provide a mechanism for vector transformation from the one frame to the other regardless of the sequence of angles defining the two frames.

$$A_F = -A_R\left(\overset{9}{\cos c \cos b}\right) - B_R\left(\overset{6}{\sin c \cos b}\right) - C_R\left(\overset{3}{\sin b}\right)$$

$$B_F = -A_R\left(\overset{8}{\cos c \sin b \sin a + \sin c \cos a}\right) - B_R\left(\overset{5}{\sin c \sin b \sin a + \cos c \cos a}\right) - C_R\left(\overset{2}{\cos b \sin a}\right)$$

$$C_F = -A_R\left(\overset{7}{\cos c \sin b \cos a + \sin c \sin a}\right) - B_R\left(\overset{4}{\sin c \sin b \cos a + \cos c \sin a}\right) - C_R\left(\overset{1}{\cos c \cos a}\right)$$

The numbers over each sine-cosine function correspond to the designations set forth in FIGURE 9. Employing them rather than the functions themselves, the inverse transformation equations may be written as follows:

$$A_R = A_F(9) + B_F(8) + C_F(7)$$
$$B_R = A_F(6) + B_F(5) + C_F(4)$$
$$C_R = A_F(3) + B_F(2) + C_F(1)$$

As illustrated in FIGURE 4 $A_F$, $B_F$ and $C_F$ are vectors associated, respectively, with first, second and third axes of rotation of a first coordinate frame and $A_R$, $B_R$ and $C_R$ are transformed vectors associated with the same axes after the axes have been rotated by a first rotation ∢$a$, a second rotation ∢$b$ and a third rotation ∢$c$.

Referring specifically to FIGURE 8, the first term is obtained by multiplying cos $a$ and cos $b$ in multiplier 110. The second term is obtained by multiplying sin $a$ by cos $b$ in multiplier 112. The third term is obtained by adding in amplifier 114 the product sin $c$ cos $a$ sin $b$ obtained from multipliers 116 and 118 and product sin $a$ cos $c$ obtained from multiplier 120. The fourth term is obtained by adding in amplifier 122 the product sin $a$ sin $b$ sin $c$ in multipliers 124, 126 with the product cos $a$ cos $c$ obtained through amplifier 130 from multiplier 128. The fifth term is simply—sin $b$. The sixth term is the sum of the output of multiplier 124 obtained in amplifier 132 through amplifier 134 and the product sin $b$ cos $a$ cos $c$ obtained from multipliers 136 and 128. The seventh term is obtained by adding in amplifier 138 the output of multiplier 116 and the product sin $a$ cos $c$ sin $b$ from multipliers 120 and 140. The eighth term is obtained from multiplier 142 as the product cos $b$ sin $c$. The ninth term is the product cos $b$ cos $c$ obtained from multiplier 144. Inasmuch as the computations illustrated are for negative angles to compute from lhe rotated frame back to the original frame, the sign of all the terms is negative. The above mentioned multipliers may be an Electronic Associates' Time Division Electronic Multiplier Model #7.006.

Referring to FIGURE 9 the computer circuit is labeled for conversion from an original frame to a generated frame and from a generated frame back to an original frame. The terminal interconnections to FIGURE 8 and other inputs for conversion from an initial frame to a generated frame are in parenthesis. In accordance with the equations set forth above, multipliers 150, 152 and 154 multiply terms 1–3 by $C_R$, (or terms 1, 4 and 7 by $C_F$), multipliers 156, 158 and 160 multiply terms 4–6 by $B_R$ (or terms 2, 5 and 8 by $B_F$), and multipliers 162, 164 and 166 multiply terms 7–9 by $A_R$ (or terms 3, 6 and 9 by $A_F$). As modified, terms 1, 4 and 7 (or terms 1, 2, 3) are then added in amplifier 168 to obtain $C_F$ (or $C_R$), terms 2, 5 and 8 (or terms 4, 5 and 6) are added in amplifier 170 to obtain $B_F$ (or $B_R$), and terms 3, 6 and 9 (or terms 7, 8 and 9) are added in amplifier 172 to obtain $A_F$ (or $A_R$). In the parenthetical case the angles will be positive and the negative sign dropped from each term.

While the foregoing is a description of the preferred embodiment, the following claims are intended to include those modifications and variations that are within the spirit and scope of my invention.

The following invention is claimed:

1. A three dimensional coordinate transformation computer comprising first, second and third function generating means each responsive to a voltage proportional to an angle for generating sines and cosines of that angle, a first angle source means for supplying to said first function generating means a voltage which is proportional to a first angle $\sphericalangle a$ generated by rotation of the first axis of a first coordinate reference frame, a second angle source means for supplying to said second function generating means a voltage which is proportional to a second angle $\sphericalangle b$ generated by rotation of a second axis normal to both said first axis and a third rotation axis, a third angle source means for supplying to said third function generating means a voltage which is proportional to a third angle $\sphericalangle c$ generated by rotation about said third rotation axis which third axis is an axis of a second coordinate reference frame, first computing means responsive to the output of said first, second and third function generating means for computing at least the terms:

(1) $\cos a \cos b$
(2) $\sin a \cos b$
(3) $-\sin b$
(4) $\sin c \cos a \sin b - \sin a \cos c$
(5) $\sin c \sin a \sin b + \cos a \cos c$
(6) $\cos b \sin c$
(7) $\sin c \sin a + \sin b \cos a \cos c$
(8) $-\sin c \cos a + \sin a \cos c \sin b$
(9) $\cos b \cos c$ said terms being grouped in a plurality of predetermined sets each comprising three of said terms, second computing means responsive to the output of said first computing means comprising first product means for selectively multiplying one of a first pair of said predetermined sets by a first quantity to produce first, second and third product outputs, second product means for selectively multiplying one of a second pair of said predetermined sets by a second quantity to produce first, second and third product outputs, third product means for selectively multiplying one of a third pair of said predetermined sets by a third quantity to produce first, second and third product outputs, first summing means for adding said first product outputs of said product means, second summing means for adding said second product outputs of said product means, and third summing means for adding said third product outputs of said product means.

2. The computer set forth in claim 1 wherein said first computing means is connected to said second computing means to provide to said first product means as said first set of three terms, terms 1, 2, 3 to provide to said second product means as said second set of three terms, terms 4, 5, 6 and to provide to said third product means as said third set of three terms, terms 7, 8, 9, said product means inputs and outputs being related by chronological order, and said third quantity is a vector associated with the first angle axis of said second coordinate frame, said second quantity is a vector associated with the second angle axis of said second coordinate frame, and said first quantity is a vector associated with the third angle axis of said second coordinate frame.

3. The computer set forth in claim 1 wherein said first computing means is connected to said second computing means to provide to said first product means as said first set of three terms, terms 1, 4, 7, to provide to said second product means as said second terms, terms 2, 5, 8, and to provide to said third product means as said third set of three terms, terms 3, 6, 9, said product means inputs and outputs being related by the order in which they appear, and said third quantity is a vector associated with the first angle axis of said first coordinate frame, said second quantity is a vector associated with the second angle axis of said first coordinate frame, and said first quantity is a vector associated with the third angle axis of said first coordinate frame.

4. The computer set forth in claim 1 wherein said function generators each comprise a sine generator and a cosine generator, said angle source means provides a voltage output having a maximum value of one polarity corresponding to $\pi$ and an equal maximum value of an opposite polarity corresponding to $-\pi$, said sine generator comprising a first input means responsive to said angle source means for generating a sawtooth waveform with opposite peaks of said waveform at $\pm\pi/2$, said cosine generator comprising a second input means responsive to said angle source means for generating a sawtooth waveform wherein the peaks of said waveform occur of one polarity at 0° and of the other polarity at $\pm\pi$, a first wave shaping means responsive to said first input means and a second wave shaping means responsive to said second input means, each of said wave shaping means comprising a feedback amplifier having a plurality of voltage responsive inverse feedback loops providing increased feedbacks in equal steps as the output voltage magnitude, positive or negative, increases.

5. The computer set forth in claim 4 wherein said feedback loops comprise first and second voltage divider networks each having a plurality of equal resistance impedance elements, said first divider network being connected between the output of said feedback amplifier and a source of positive voltage, said second divider network being connected between the output of said feedback amplifier and a source of negative voltage, the input of said feedback amplifier being connected through rectifier-resistance paths to interconnections of said impedance elements, said rectifiers connected to said first divider network being poled to permit current flow toward said first divider network and those connected to said second divider network being poled to permit flow away from said second divider network.

6. The computer set forth in claim 5 wherein said first angle source means comprises a first multiplier for providing $\omega_1 \cos c$, a second multiplier for providing $\omega_2 \sin c$, first adding means responsive to said first and second multiplirs for providing $\omega_1 \cos c + \omega_2 \sin c$, dividing means responsive to the output of said first summing means for dividing said last named output by $\cos b$, first integrating means responsive to the output of said dividing means for providing an output $\sphericalangle a$ to said first function generating means, first phase reversing means including a switch and a unity gain phase reversing amplifier connected between said dividing means and said first integrating means for providing either phase of the output of said dividing means, second phase reversing means including a switch and a unity gain phase reversing amplifier connected to the sine output of said first function generating means for providing either phase of the sine $\sphericalangle a$, switching means responsive to the output of said integrating means and connected to said switches of said first and second phase reversing means for causing phase reversal whenever $\sphericalangle a$ approaches $\pm\pi$, said second angle source means comprises a third multiplier for providing $\omega_1 \sin c$, a fourth multiplier for providing $\omega_2 \cos c$, a second adding means responsive to the output of said third and fourth multipliers for providing $\omega_2 \cos c + \omega_1 \sin c$, second integrating means responsive to the output of said second adding means for providing an input $\measuredangle b$ to said second function generating means; said third angle source means comprises a fifth multiplier responsive to sin $b$ and the output of said first divider, a third adding means responsive to $\omega_3$ and the output of said fifth multiplier, third integrating means responsive to the output of said third adding means for providing an input $\measuredangle c$ to said third function generating means, third phase reversing means including a switch and a unity gain phase reversing amplifier connected between said third adding means and said integrating means or providing either phase of the output of said third adding means, fourth phase reversing means comprising a switch and a unity gain phase reversing amplifier connected to the sine output of said third function generating means for providing either phase of sin $c$, switching means responsive to the output of said third integrating means and connected to the switches of said third and fourth phase reversing means for producing phase reversal whenever $\measuredangle c$ approaches $\pm\pi$ and wherein said $\omega_1$, $\omega_2$, $\omega_3$ are as defined in the specification.

7. The computer set forth in claim 6 wherein said angle sources each comprise means for selectively adding an initial angle to the output of said integrating means or supplying an externally generated angle to said function generating means.

References Cited in the file of this patent

UNITED STATES PATENTS

| | | |
|---|---|---|
| 2,906,933 | Magnin | Sept. 29, 1959 |
| 2,945,643 | Slater | July 19, 1960 |